(12) United States Patent
Flynn (10) Patent No.: US 7,898,135 B2
(45) Date of Patent: Mar. 1, 2011

(54) HYBRID PERMANENT MAGNET MOTOR

(75) Inventor: Charles J. Flynn, Greenwood, MO (US)

(73) Assignee: QM Power, Inc., Greenfield, NH (US)

( * ) Notice: Subject to any disclaimer, the term of this patent is extended or adjusted under 35 U.S.C. 154(b) by 383 days.

(21) Appl. No.: 12/044,797

(22) Filed: Mar. 7, 2008

(65) Prior Publication Data

US 2009/0160391 A1 Jun. 25, 2009

Related U.S. Application Data

(60) Provisional application No. 60/893,496, filed on Mar. 7, 2007.

(51) Int. Cl.
H02K 21/00 (2006.01)

(52) U.S. Cl. .................... 310/152; 310/180; 310/181

(58) Field of Classification Search .............. 310/180, 310/181, 152, 156.01, 154.06; 318/118, 318/140, 159, 244, 700, 727, 747, 750, 773, 318/774, 775; 322/46
See application file for complete search history.

(56) References Cited

U.S. PATENT DOCUMENTS

| | | | |
|---|---|---|---|
| 3,678,352 A | 7/1972 | Bedford | |
| 4,093,905 A | 6/1978 | von Braun | |
| 4,516,048 A | 5/1985 | Brigham | |
| 4,910,475 A | 3/1990 | Lin | |
| 4,945,268 A | 7/1990 | Nihei et al. | |
| 5,332,488 A | 7/1994 | Mitsuji | |
| 5,631,512 A | 5/1997 | Kawabata et al. | |
| 5,672,925 A * | 9/1997 | Lipo et al. | 310/154.11 |
| 5,825,112 A | 10/1998 | Lipo et al. | |
| 6,013,963 A * | 1/2000 | Shelton, Jr. | 310/179 |
| 6,051,904 A | 4/2000 | Akemakou et al. | |
| 6,057,622 A * | 5/2000 | Hsu | 310/191 |
| 6,246,561 B1 * | 6/2001 | Flynn | 361/147 |
| 6,340,857 B2 | 1/2002 | Nishiyama et al. | |
| 6,342,746 B1 | 1/2002 | Flynn | |
| 6,373,162 B1 * | 4/2002 | Liang et al. | 310/156.53 |
| 6,410,726 B1 | 6/2002 | Powers | |
| 6,426,577 B1 | 7/2002 | Sekiyama et al. | |
| 6,507,257 B2 * | 1/2003 | Mohler | 335/220 |

(Continued)

OTHER PUBLICATIONS

Stephen J. Chapman, Electric Machinery Fundamentals, 1991, McGraw-Hill, Inc., 2nd edition, pp. 395-397.*

(Continued)

*Primary Examiner*—Walter Benson
*Assistant Examiner*—Antony M Paul
(74) *Attorney, Agent, or Firm*—Cooley LLP (57) ABSTRACT

An electro-mechanical device that functions as a motor or a generator and methods for constructing and using such electro-mechanical device are provided. The electro-mechanical device features permanent magnets placed in a magnetically attracting manner and inter-dispersed between control coils. The control coils are energized to create a flux opposing the flux of the permanent magnets and to create a rotational torque on the poles of a salient pole rotor before those poles align with the poles of the energized control coil stator segment. Power can be generated by placing the flux of the control coils in a steady state and mechanically rotating the salient pole rotor. The electro-mechanical device provides little or no cogging forces, high-efficiency operation, and a high power density.

17 Claims, 9 Drawing Sheets

U.S. PATENT DOCUMENTS

| | | | |
|---|---|---|---|
| 6,531,799 B1 * | 3/2003 | Miller | 310/114 |
| 6,707,208 B2 * | 3/2004 | Durham et al. | 310/156.37 |
| 6,956,453 B2 * | 10/2005 | Osterberg | 335/229 |
| 7,034,499 B2 * | 4/2006 | Kerlin et al. | 318/749 |
| 7,538,524 B2 * | 5/2009 | Sullivan et al. | 322/46 |
| 2003/0025418 A1 | 2/2003 | Kang et al. | |

OTHER PUBLICATIONS

International Search Report and Written Opinion, International Application No. PCT/US08/58521, mailed Aug. 4, 2008 (15 pages).

International Search Report and Written Opinion, International Patent Application No. PCT/US08/56240, mailed Aug. 1, 2008 (7 pages).

\* cited by examiner

HYBRID PERMANENT MAGNET MOTOR

CROSS-REFERENCE TO RELATED APPLICATION

This application claims benefit under 35 U.S.C. §119(e) of U.S. Provisional Patent Application No. 60/893,496, entitled "Hybrid Permanent Magnet Motor," filed Mar. 7, 2007, which is hereby incorporated by reference herein in its entirety.

TECHNICAL FIELD OF THE DISCLOSURE

Apparatus and methods for providing a permanent magnet electro-mechanical device that functions as a motor or generator are disclosed.

BACKGROUND OF THE DISCLOSURE

With few exceptions the basic operating principles for electric motors and generators have not changed much over the past 100 years. With the development of high energy or high coercive force permanent magnets the power density and efficiency of electric motors was increased over the then state of the art motor technologies by replacing the field coils in brush motors or armature coils in brush-less motors with permanent magnets. The permanent magnets require less space and typically weigh less than the copper windings they replaced and reduce the I2R losses of the motor's total electrical system.

Replacing coils with permanent magnets introduced a new motor design challenge. The field of the permanent magnets cannot be 'turned off,' which introduces high cogging torques at start-up. The constant magnetic flux also causes the motor's back electromotive force to become linear with speed, resulting in a linear speed to torque relationship, which reduces the efficiency of operation when the motor is producing peak power. Most of the approaches to control the efficiency at peak output power for permanent magnet motors have been directed toward electronically controlling the phase excitation angles and current. This electronic control approach works well for modifying the linear speed to torque relation to produce a more hyperbolic speed to torque relationship, but requires increasing the size and ultimately the weight of the controlled motor. This controller approach results in a counter productive exercise for the most part because while permanent magnets were used to reduce motor size and weight, in order to optimize efficiency at peak power, the motor size and weight is increased to that of motors using copper windings. By having to resize the motor, some of the benefits of using permanent magnets in the motor are negated.

SUMMARY OF THE DISCLOSURE

This disclosure relates to a permanent magnet electro-mechanical device that functions as a motor or generator that uses control coils, a shaft mounted salient pole rotor, bearings and structural components and a novel arrangement of two or more permanent magnets placed in the stator portion. This construction exhibits low cogging forces, high efficiency and high power density. The rotor and stator pole geometries and spacing relationships can be arranged to operate as either a single phase or multi phase motor.

In one aspect, an electro-mechanical device includes a rotor having a plurality of poles arranged about a central axis of rotation, and a stator including a plurality of stator segments arranged on a circle that circumscribes the rotor and defining a magnetic flux path, said stator also including a plurality of permanent magnets, each of which has north and south pole faces and is positioned between a different pair of stator segments among the plurality of stator segments, wherein each stator segment has at least two poles extending toward the rotor, and wherein the permanent magnets are serially arranged along the magnetic flux path defined by the plurality of stator segments with pole faces arranged south to north.

In another aspect, an electro-mechanical device includes a rotor with a central axis of rotation and a first and a second pole, a stator enclosing the rotor, the stator including: at least two stator segments, a first permanent magnet having a north pole and a south pole and disposed with the north pole adjacent to a first stator segment of the at least two stator segments, and a second permanent magnet having a north pole and a south separated from the first permanent magnet by the first stator segment, wherein the first permanent magnet and the second permanent magnet provide a magnetic flux and this magnetic flux passes through the first stator segment.

In yet another aspect an electro-mechanical device includes a first means for providing a plurality of poles arranged about a central axis of rotation, and second means for providing a plurality of stator segments arranged on a circle that circumscribes the first means and defining a magnetic flux path, said second means also including a plurality of magnetic means, each of which has north and south pole faces and is positioned between a different pair of stator segments among the plurality of stator segments, wherein each stator segment has at least two poles extending toward the first means, and wherein the magnetic means are serially arranged along the magnetic flux path defined by the plurality of stator segments with pole faces arranged south to north.

DETAILED DESCRIPTION OF THE DISCLOSURE

An apparatus, method and means for providing a permanent magnet electro-mechanical device that functions as a motor or generator are disclosed. The permanent magnets in the electro-mechanical device are arranged in the stator in an attracting manner. This can provide a one hundred percent field weakening when no current is flowing in the phase windings and allow control of the electro-mechanical device through the phase windings. The arrangement additionally provides low to no cogging torque or back electromotive force because the magnetic flux of the permanent magnets generally does not act across the air gap between the rotor and stator. A small amount of fringing flux may be present in device operation, but this does not produce the back electromotive force that is present in typical permanent magnet motors. The arrangement of magnets and phase windings also provides high efficiency operation of the electro-mechanical device by allowing phase winding flux to be applied in conjunction with permanent magnet flux to the torque produced.

Figure 1:
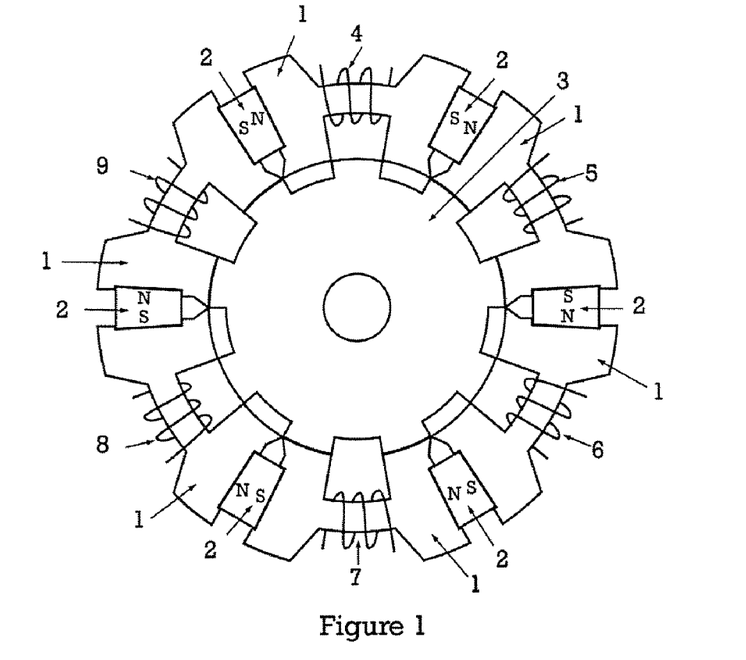
FIG. 1 is a diagram illustrating a permanent magnet electro-mechanical device.

FIG. 1 shows the arrangement of a magnetic circuit for single phase operation in an embodiment of the electro-mechanical device. The electro-mechanical device of FIG. 1 includes six stator segments 1, six magnets 2, six control coils numbered 4 through 9 wound on each stator segment 1 and a nine salient pole rotor 3. The six magnets 2 each have a north and south face or pole. The nine salient pole rotor includes nine poles that protrude slightly from the rotor. It should be understood that there is no limit to the number of poles and the number of poles can be odd or even.

Figure 2:
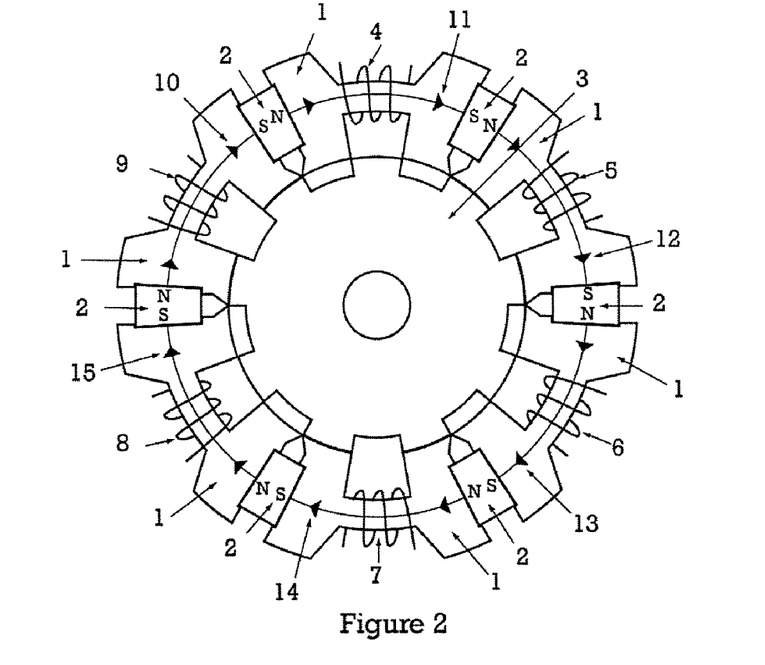
FIG. 2 is a diagram illustrating flux in the stators of the permanent magnet electro-mechanical device.

In constructing the electro-mechanical device of FIG. 1, magnet 2 is placed adjacent to and between each of the stator segments 1 to form a continuous annular ring. Each of the magnets 2 is separated by a stator segment and the magnets 2 are arranged in a manner where their magnetic poles are opposing. That is, when traveling around the annual ring clockwise, the magnet poles of the magnets are arranged in a south north, south north, south north . . . south north fashion. As shown in FIG. 2, arranging the permanent magnets 2 in this manner results in the permanent magnet 2's magnetic flux 10 through 15 being completely contained in the stator segments 1. The magnetic flux 10 travels through the stator segments along a magnetic flux path. Since the magnet 2's magnetic flux 10 through 15 is completely contained in the stator segments 1, the salient pole rotor 3 experiences little to no magnetic force or torque and is able to rotate freely. Each stator segment 1 forms two stator poles in FIG. 1, and the two stator poles are joined by a bridge section. The bridge section is where control coils 4 through 9 are wound in the embodiment of FIG. 1.

A rotational torque is created by energizing alternate control coils in a timed manner. The timing can be controlled by a microprocessor, for example, that selects which coils to energize and for how long based on information, such as the speed of the rotor and slip in the rotor. Energizing alternate control coils in a timed manner creates a magnetic flux that acts on the poles of the salient pole rotor to produce rotation of the rotor. For example, in FIG. 1, control coils 4, 6 and 8 and control coils 5, 7 and 9 are alternatively energized. The energizing of the control coil creates a magnetic flux that opposes the flux of the permanent magnets 2 located adjacent to the energized control coil. This opposing flux produced when current flows in a control coil displaces an equal amount of flux generated by the adjacent permanent magnets 2. The amount of permanent magnet flux displaced can be a portion of the permanent magnet's flux or all of the permanent magnet's flux, depending upon the amount current flowing through the coil and the amount of flux this current produces.

Figure 3:
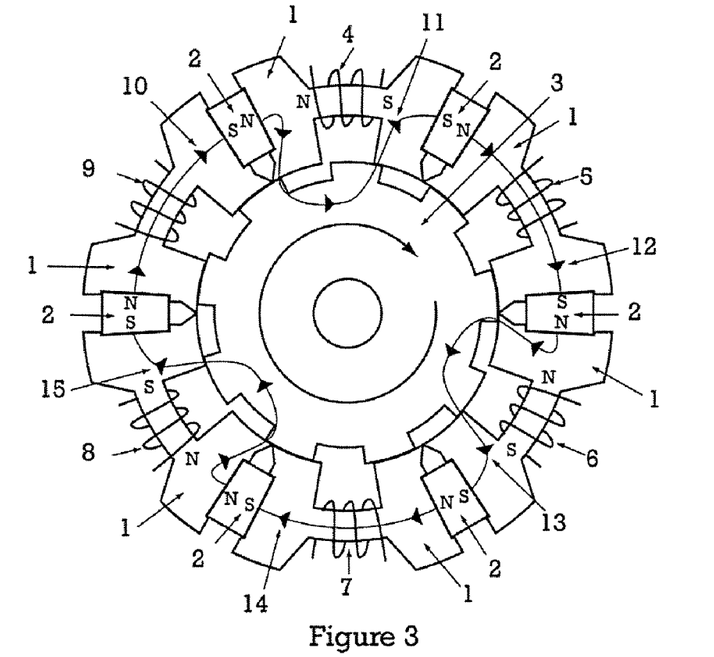
FIG. 3 is a diagram illustrating certain control coils energized to create a magnetic flux in the permanent magnet electro-mechanical device.
Figure 4:
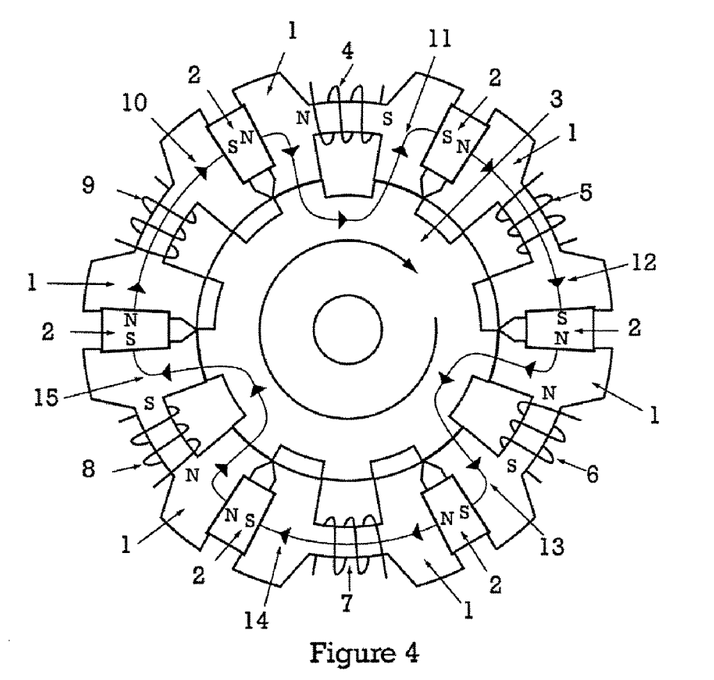
FIG. 4 is a diagram illustrating a displaced permanent magnet flux in the permanent magnet electro-mechanical device.

FIG. 3 shows control coils 4, 6 and 8 energized to create a magnetic flux that opposes the magnetic flux produced by the permanent magnets adjacent to the stator segments 1 on which these control coils are wound. To rotate the rotor, the control coils are energized when the stator poles of a stator segment 1 and the poles of the salient pole rotor are in an unaligned position. The magnetic flux created by control coils 4, 6, and 8 opposes and displaces the magnetic flux 11, 13 and 15 produced by the adjacent permanent magnets 2. The adjacent permanent magnets' 2 flux is displaced into the unaligned poles of the salient pole rotor 3. This displaced permanent magnet flux creates a force that acts between the unaligned stator segment 1 poles and the salient rotor 3 poles creating a rotational torque that acts to bring the poles into alignment as shown in FIG. 4.

Once the poles of the salient pole rotor 3 have rotated into alignment with the respective poles of the stator segments 1 on which control coils 4, 6, and 8 are wound, control coils 4, 6, and 8 are de-energized. This allows the displaced flux from the permanent magnets 2 adjacent to each end portion of the stator segment 1 on which the control coils 4, 6 and 8 are wound to return to a contained state in stator segments 1. When the flux is contained within stator segments 1 (as shown in FIG. 2), generally any force that was creating a rotational torque on the salient pole rotor 3 is removed. This turning of rotor places the poles of the salient pole rotor 3 out of alignment with respect to the poles formed by the stator segments 1 on which control coils 5, 7 and 9 are wound. Further rotation can be caused by energizing control coils 5, 7 and 9 while keeping coils 4, 6 and 8 de-energized.

Figure 5:
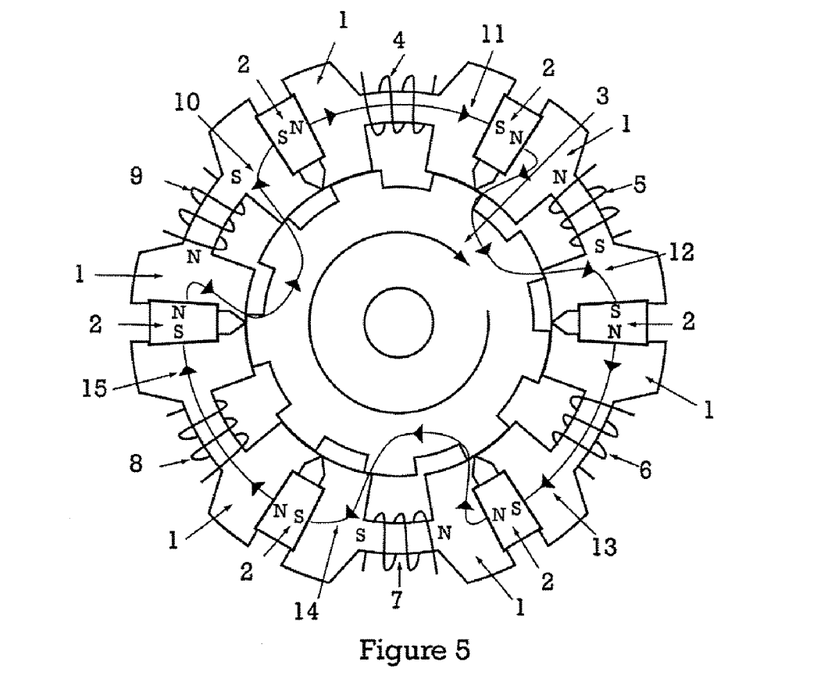
FIG. 5 is a diagram illustrating an intermediate salient pole rotor position flux in the permanent magnet electro-mechanical device.
Figure 6:
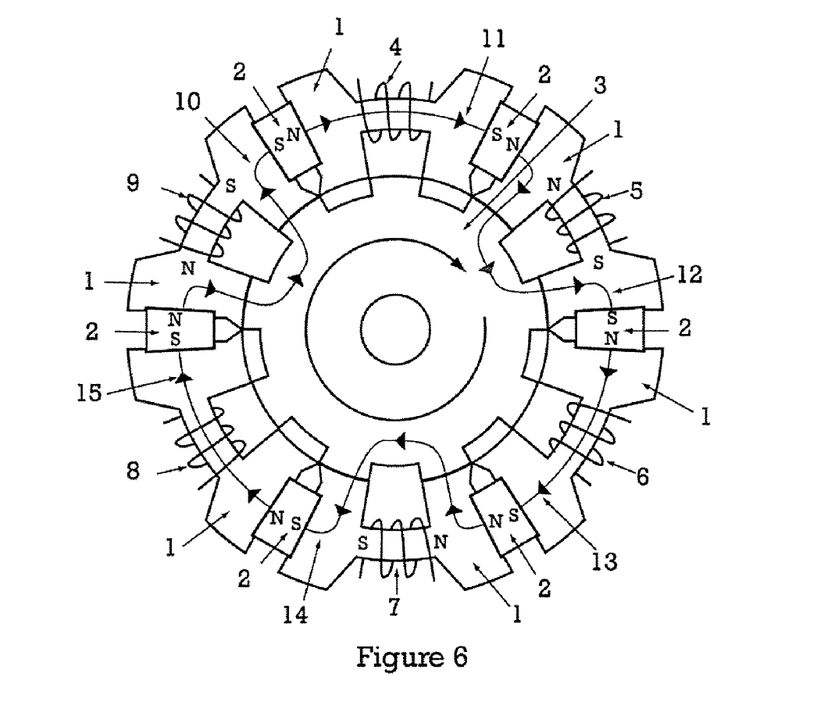
FIG. 6 is a diagram illustrating a rotor position where the poles are aligned in the permanent magnet electro-mechanical device.

As shown in FIG. 5, the magnetic flux created by control coils 5, 7 and 9 opposes and displaces the magnetic flux 10, 12 and 14 produced by the adjacent permanent magnets 2. The displaced permanent magnet flux 10, 12 and 14 then acts on the unaligned poles of the salient pole rotor 3 creating a rotational torque that acts to bring the poles into alignment as shown in FIG. 6.

Figure 7:
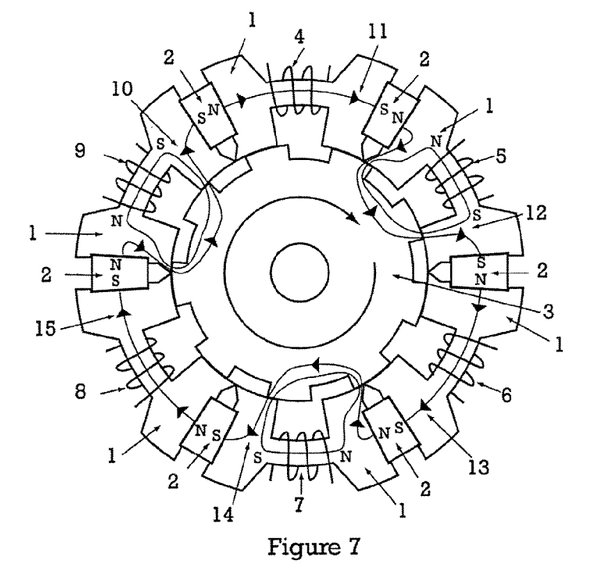
FIG. 7 is a diagram illustrating certain control coils producing an increased amount of magnetic flux in the permanent magnet electro-mechanical device.

As mentioned above, the amount of permanent magnet flux that is displaced is limited to the inherent amount of flux produced by the permanent magnet. The inherent amount of permanent magnet flux displaced can be less if less opposing control coil flux is provided. The total amount of flux acting on the salient pole rotor can be greater than the inherent amount of flux produced by the permanent magnet. This is accomplished by energizing the control coil to produce a flux that is greater than the flux produced by the permanent magnet. In this case, the flux leaving the poles formed by a stator segment 1 and entering the poles of the salient pole rotor 3 can be the sum of the permanent magnet's flux plus the coil's flux that is greater than the permanent magnet's flux. The incremental force acting between the stator segment 1 poles and the salient rotor poles is the sum of the flux linkages created by both the permanent magnet's flux and the phase coils flux and the angular overlap of stator and rotor poles. FIG. 7 demonstrates a case where control coils 5, 7 and 9 are producing a magnetic flux 10, 12 and 14 in an amount that is double that of the permanent magnets.

Figure 8:
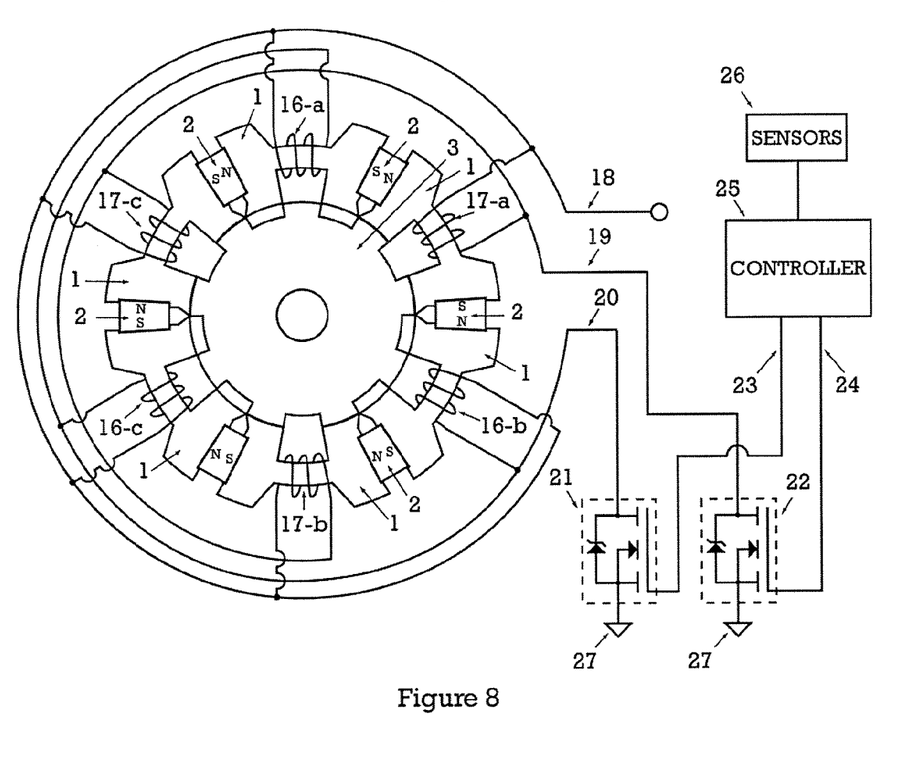
FIG. 8 is a diagram illustrating wiring and control of the electro-mechanical device.

FIG. 8 shows a wiring diagram and a controller in an embodiment of the electro-mechanical device. The control coils are wired in two groups: group 16 including control coils 16-a, 16-b and 16-c and group 17 including control coils 17-a, 17-b and 17-c. In FIG. 8 each coil within a group is shown electrically coupled in parallel, but the coils may also be coupled electrically in series. The control coils have a winding 'start' lead and a winding 'end' lead. The direction the permanent magnets 2 are inserted determines how the start and end leads are connected when wiring the electro-mechanical device. The first of the two leads is coupled to a common bus 18, and a bus terminal of common bus 18 is connected to the positive connection of an electrical power source. The second lead of coils 16-a, 16-b and 16-c is coupled to bus 20. The second lead of coils 17-a, 17-b and 17-c is connected to bus 19.

Buses 19 and 20 are each coupled to power switches 22 and 21 respectively. Power switches 21 and 22 may be any electrical or semiconductor switch such as a power metal-oxide-semiconductor field effect transistor (MosFet), an insulated gate bipolar transistor (IGBT), power junction field effect transistors, or Mos-controlled thyristors, for example. Gates 23 and 24 control the operation of switches 21 and 22 respectively. A control signal is provided to gate of the power switch, and the control signal determines whether the power switch is turned on (in a conducting state) or turned off. Controller 25 provides a control signal which can be a bias or control voltage/current. The controller 25 supplies the control signal to power switch 21 or 22 based on the angular position of the poles on rotor 3 relative to the poles on stator segment 1. When a power switch is turned on, a unidirectional current flows from bus terminal 28, through the control coils coupled to that bus, and out of terminals 27. Terminals 27 are coupled to a negative connection of the electrical power source. Various sensors 26 are coupled to controller 25 to determine rotor position and other motor operating parameters. The other motor operating parameters that can be controlled are voltage and current, for example. Sensors 26 can be implemented using a Hall Effect sensor or using optical or circuit components such as op amp comparators to supply control signals to controller 25.

Figure 9:
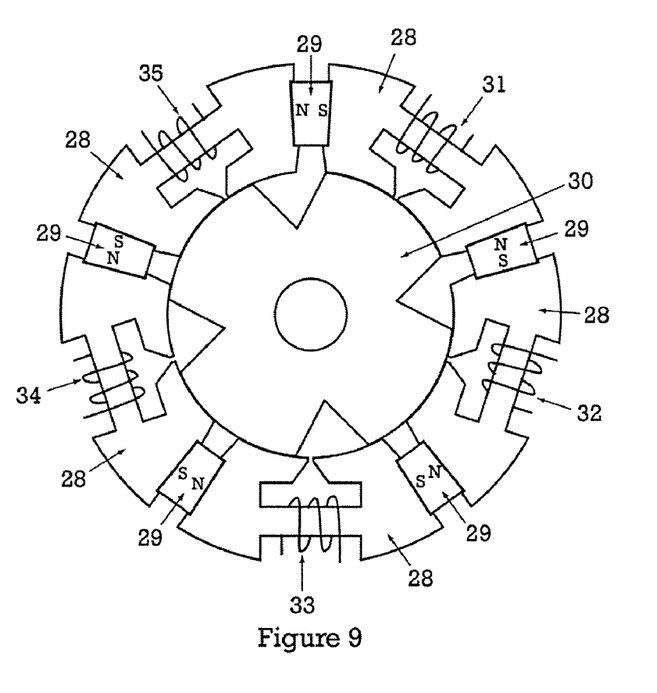
FIG. 9 is a diagram illustrating an electro-mechanical device constructed with five stator segments.

FIG. 9 shows a multiphase construction of the magnetic circuit in an embodiment of the electro-mechanical device. The electro-mechanical device of FIG. 9 includes five stator segments 28, five magnets 29, a four salient pole rotor 30, five control coils numbered 31 through 35 that are wound on each stator segment 28. With the exception of the number salient pole rotor poles verses the stator poles formed by the stator segments, the theory of operation remains the same as with the single phase construction.

The control coils 31 though 35 are energized in a sequence to displace the permanent magnet's 29 flux into the unaligned salient pole rotor poles. As explained above, this produces a force to pull the poles into alignment and results in a rotational torque on the salient pole rotor 30.

Figure 10:
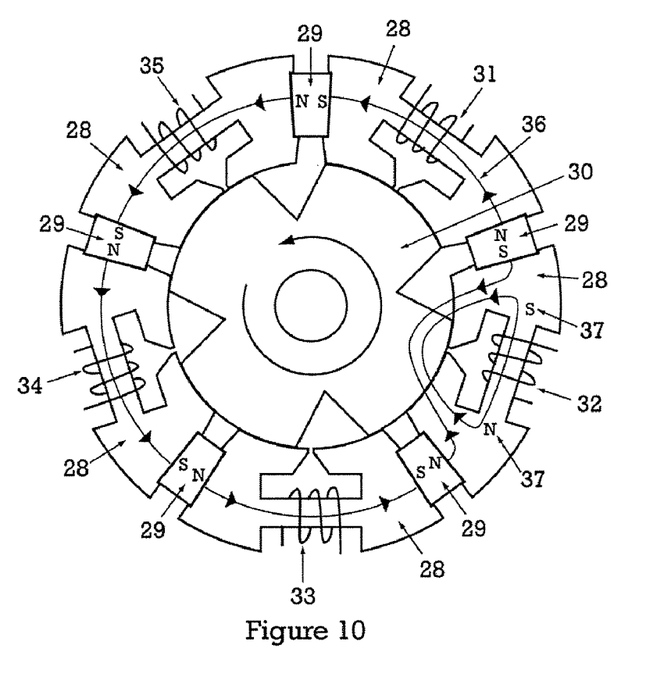
FIGS. 10, 11, and 12 are diagrams illustrating a control coil switching sequence in a permanent magnet electro-mechanical device.
Figure 11:
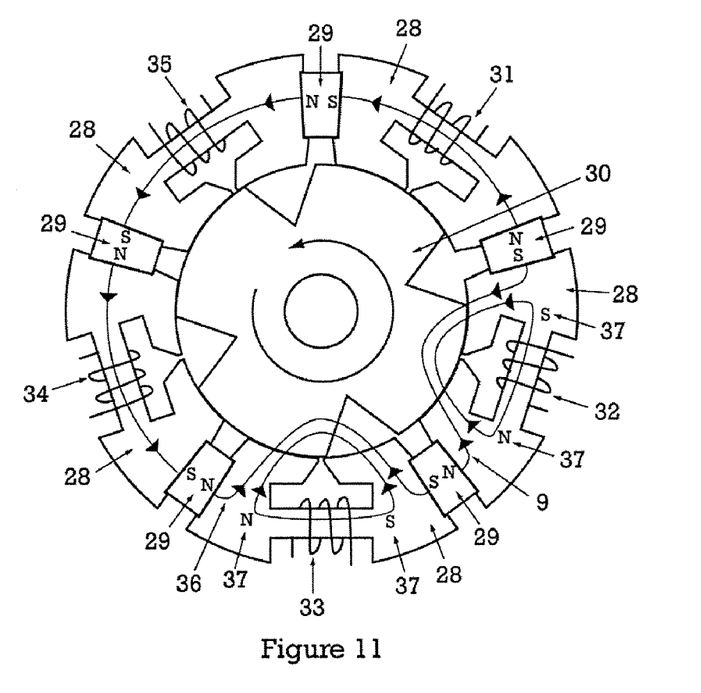
Figure 12:
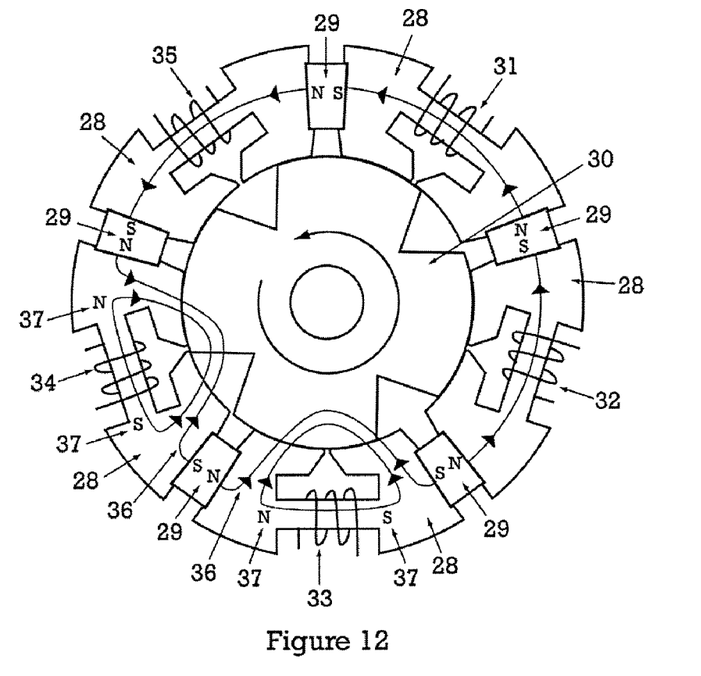

FIGS. 10, 11 and 12 show a control coil switching sequence for a multiphase electro-mechanical device in an embodiment that produces continuous rotation of the salient pole rotor 30. FIG. 10 includes permanent magnet flux 36 and coil magnetic polarity 37. The coil magnetic polity 37 shows how control coil 32 is energized in FIG. 10 to move permanent magnet flux 36 into rotor 30. As shown, the control coils are energized in sequence of 32-33, 33-34, 34-35, 35-31 then 31-32 in this embodiment. Based on this sequence, the electro-mechanical device is a five phase device. The sequential energizing creates a rotating magnetic field directed into the salient pole rotor 30 to produce a rotational torque. One advantage of multi-phase electro-mechanical devices, such as the embodiment of FIGS. 9-12, is that multi-phase electro-mechanical devices can be designed to run off alternating current.

Figure 13:
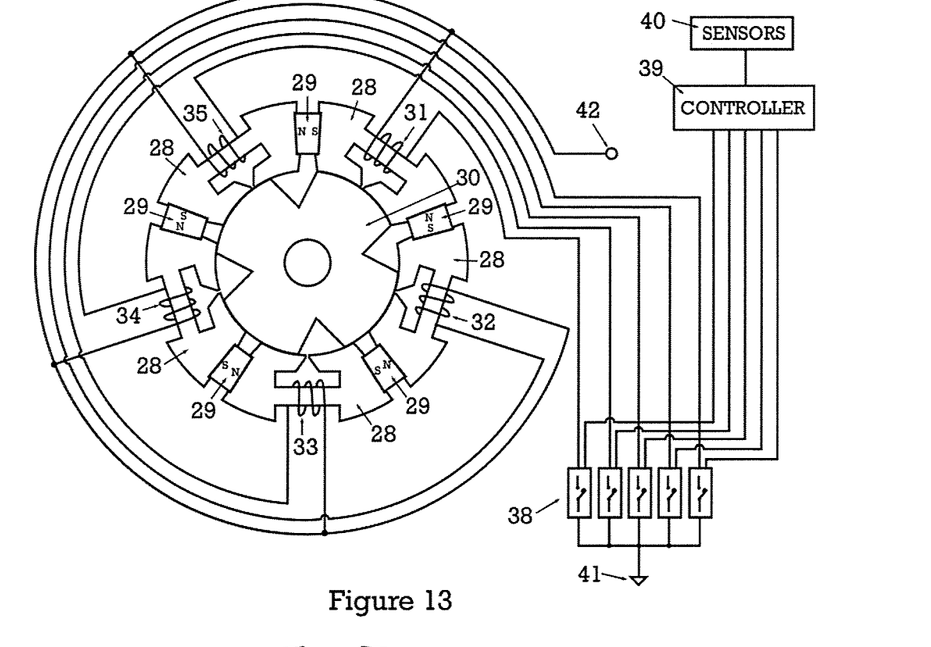
FIG. 13 is a diagram illustrating wiring and control of a multi-phase electro-mechanical device.

FIG. 13 shows a wiring diagram and a controller a multi-phase embodiment of the electro-mechanical device. The control coils have a winding 'start' lead and a winding 'end' lead. The direction the permanent magnets 29 are inserted determines how the start and end leads are connected when wiring the electro-mechanical device. The first of the two leads is coupled to a common bus 42 that includes a bus terminal, which is coupled to the positive connection of an electrical power source. The second of the two leads of the control coils is coupled by a bus to an individual power switch, of power switches 38.

Controller 39 provides a control signal which can be a bias or control voltage/current. The controller 39 supplies the control signal to power switches 38 based on the angular position of the poles on rotor 30 relative to the poles on stator segment 28. When a power switch is turned on, a unidirectional current flows from bus terminal 42, through the control coils coupled to that bus, and out of terminals 41. Terminals 41 are coupled to a negative connection of the electrical power source. Various sensors 40 are coupled to controller 39 to determine rotor position and other motor operating parameters. The other motor operating parameters that can be controlled are voltage and current, for example. Sensors 40 can be implemented using a Hall Effect sensor or using optical or circuit components such as op amp comparators to supply control signals to controller 39.

Figure 14:
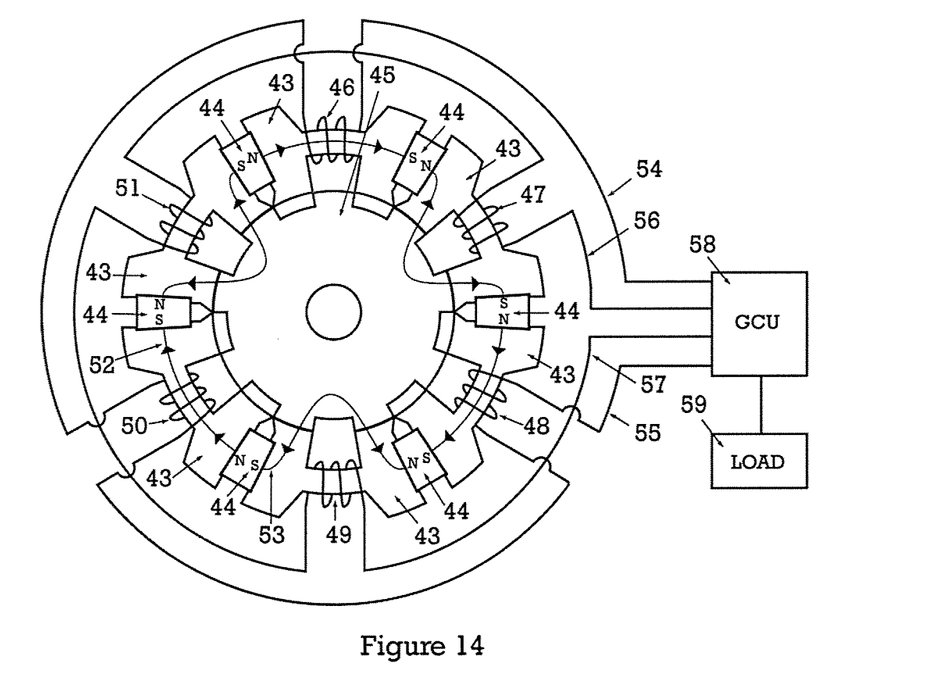
FIG. 14 is a diagram illustrating the electro-mechanical device setup to function as a generator.

A motor function of the electro-mechanical device has been explained through FIGS. 1 through 7 and FIGS. 9 through 12. FIG. 14 shows the embodiment of FIG. 1 operating as a generator. The electro-mechanical device includes stator segments 43, permanent magnets 44, salient pole rotor 45, coils 46 through 51, magnetic flux 52, displaced flux 53, buses 54 though 57, generator control unit (GCU) 58, and load 59. To generate electricity from the electro-mechanical device, the control coils 31 though 35 are energized with a potential to displace a controlled or steady state amount of magnetic flux 52 from the magnetic flux path across the air gap onto the salient pole rotor poles. The energy used to displace the magnetic flux 52 of permanent magnets 44 from a magnetic flux path into the rotor is less for a coil on a stator segment whose poles are in alignment with salient pole rotor 45. A stator segment whose poles are unaligned with the salient pole rotor 45 uses more energy to displace magnetic flux 52. When the salient pole rotor 45 is rotated using an external rotating mechanical torque, a varying air gap reluctance induces a voltage into the coils 46 through 51. The electrical power produced is the difference of the additional potential minus the potential used to displace the permanent magnet flux.

In FIG. 14 group 1 coils 46, 50 and 48 are wired electrically in series and group 2 coils 47, 51 and 49 are wired electrically in series and the two groups of series connected coils are connected to the GCU 58 through buses 54 through 57. The GCU supplies the initial potential to the coils to displace all or any portion of the permanent magnet flux 52 into the rotor 45 as shown by displaced flux 53 to initiate generator functionality. The GCU can also control the balance of the power flowing to the load 59 from the two coil groups. The coil groups may alternatively be connected in parallel or series parallel combinations.

Figure 15:
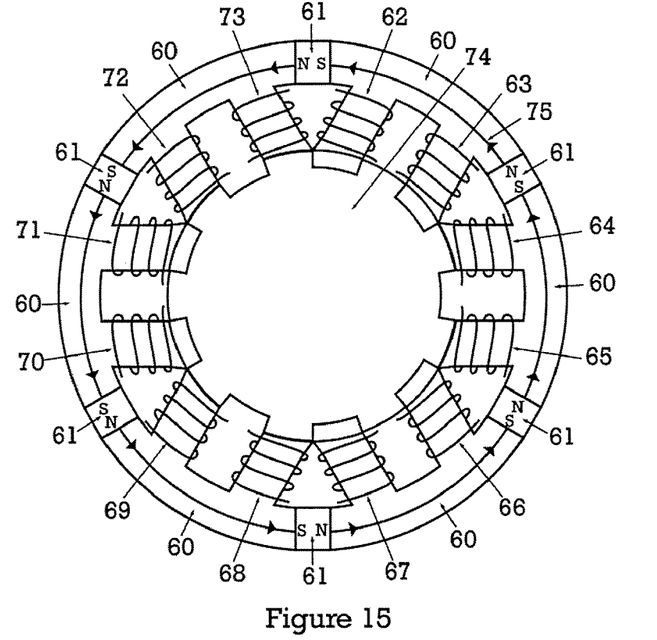
FIGS. 15, 16 and 17 are diagrams illustrating a pole wound electro-mechanical device.

FIG. 15 shows an embodiment of the electro-mechanical device where control coils are wound on the salient poles of a stator segment. The electro-mechanical device of FIG. 15 includes stator segments 60, permanent magnets 61, control coils 62 through 73, and rotor 74. Control coils 62 through 73 are each wound on a salient pole of a stator segment 60. Permanent magnets 61 separate each stator segment 60 and are arranged along a magnetic flux path. In FIG. 15 the stator segments circumscribe rotor 74 and the magnetic flux path passes through stator segments 60.

Figure 16:
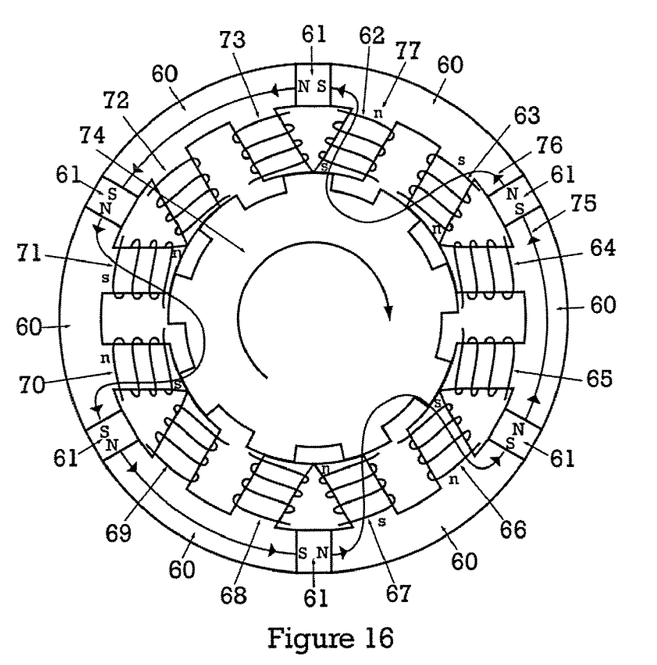

FIG. 16 shows the motor operation of the embodiment of FIG. 15. Motor operation is implemented by energizing the control coils 62 through 73 to produce a flux polarity 77. Flux polarity 77 couples with the permanent magnet flux 76 pulling this flux through the stator segment's salient pole. The ends of the stator segment's 60 poles have opposite magnetic polarities as determined by the coils magnetic flux polarity 77. The stator segment's poles create a flux path from a first magnet through the stator segment coil to the rotor and back through a second stator segment coil to a second magnet. This is illustrated by magnetic flux 76 traveling from a first magnet 61 through coil 63, across an air gap to rotor 74, through rotor 74, across a second air gap, though coil 62, and through a second magnet 61 on the other side of a stator segment 60.

Figure 17:
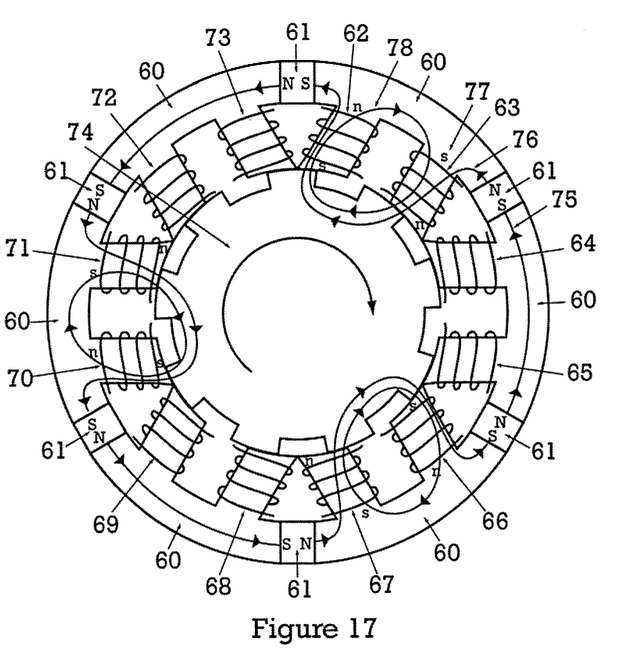

FIG. 17 shows how additional flux can be passed through the rotor of the electro-mechanical device. This additional flux can be created by producing a quantity of flux 78 that exceeds the permanent magnet's flux 76. The excess control coil flux adds to the permanent magnet's flux 76 across the air gap between the stator segment's 60 poles and the poles on the rotor 74. This additional flux adds to the torque produced as a square of the total flux in the air gap.

Figure 18:
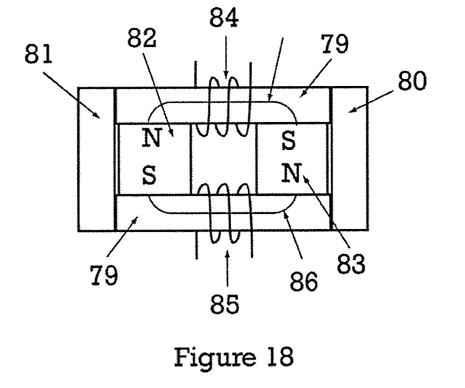
FIGS. 18 and 19 are diagrams illustrating a permanent magnet flux control method.
Figure 19:
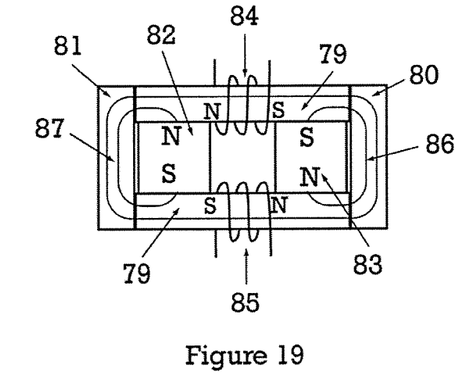

FIGS. 18 and 19 depict a permanent magnet flux control method used in the electro-mechanical device in an embodiment. The device shown in FIGS. 18 and 19 includes an upper and lower flux path 79, two armatures 80 and 81, magnets 82 and 83, and control coils 84 and 85. The magnets 82 and 83 are positioned with attracting poles adjacent to the upper flux path. When control coils 84 and 85 are not energized, the flux 86 and 87 from the permanent magnets 82 and 83 traverse the upper and lower flux paths 79. When the control coils 84 and 85 are energized, they produce a flux that opposes the flux from magnets 82 and 83. The flux 87 from permanent magnet 82 then traverses armature 81 and the flux 86 from permanent magnet 83 traverses armature 80. The flux from the control coils 84 and 85 traverses both armatures. In rotating motor applications armatures 80 and 81 would represent a rotor, and with the coils de-energized the rotor would experience little to no cogging torque.

The materials used for the rotor and stator segments of the electro-mechanical device, such as stator segment 1 and rotor 3, for example, and can be composed of a magnetically soft material. Magnetically soft materials are materials that are easily magnetized when a magnetizing field is applied and retain substantially no magnetic field once the magnetizing force is removed. This magnetically soft material can be a solid material, but to reduce eddy currents and core losses the magnetically soft material can be laminated or used in particle form with a bonding material or after sintering. Many different magnetically soft materials can be used, and the various embodiments of the electro-mechanical device are not limited to a particular magnetically soft material.

The materials used for the permanent magnets such as the permanent magnets 2, for example, are composed of a magnetically hard material. Magnetically hard materials are materials that sustain a substantial magnetic field after a magnetizing field has been applied and then removed. There are many magnetically hard materials, such as neodymium, samarium cobalt, Alnico, and other compositions. The various embodiments of the electro-mechanical device are not limited to any particular magnetically hard material.

The coils are referred to as control coils in this description since they control the flux from permanent magnets, but they could also be referred to as phase coils or just coils that carry an electrical current to produce a magnetic field. It should be understood that there is no limit to the number of poles used greater than two and that an odd or even amount of poles can be used. Also stator segments can form more than two stator poles in some embodiments. The GCU can be implemented with circuits, a microprocessor, or mechanically depending on the embodiment. The power switches of the various embodiments may be any electrical or semiconductor switch such as a power metal-oxide-semiconductor field effect transistor (MosFet), an insulated gate bipolar transistor (IGBT), power junction field effect transistors, or Mos-controlled thyristors, for example. Other embodiments are within the scope of the following claims.

I claim:

1. An electro-mechanical device comprising:
   a rotor having a plurality of poles arranged about a central axis of rotation; and
   a stator including a plurality of stator segments arranged on a circle that circumscribes the rotor and defining a magnetic flux path, said stator also including a plurality of permanent magnets, each of which has north and south pole faces oriented in a first direction and is positioned between a different pair of stator segments among the plurality of stator segments, wherein the different pair of stator segments each has permanent magnets with north and south pole faces oriented in a second direction opposite the first direction, wherein each stator segment has an associated coil, which when energized produces flux that opposes flux from the permanent magnets, such that the flux from the permanent magnet traverses into the rotor and which when de-energized isolates the flux from the permanent magnets to the stator with the rotor experiencing little or no cogging torque.

2. The electro-mechanical device of claim 1, wherein each stator segment includes a first pole and a second pole and a bridge section separating the first and second poles and each stator segment also includes a coil wound around the bridge section for that stator segment.

3. The electro-mechanical device of claim 2, further comprising a controller that controls energizing of the plurality of coils.

4. The electro-mechanical device of claim 3, wherein said controller is configured to simultaneously energize every other coil among the plurality of coils while not energizing the rest of the coils and then simultaneously energize the rest of the coils while not energizing the said every other coil.

5. The electro-mechanical device of claim 3, wherein the controller is configured to sequentially energize the coils around the stator.

6. The electro-mechanical device of claim 1, wherein each stator segment includes a first pole and a second pole and each stator segment also includes a first coil wound around the first pole and a second coil wound around the second pole.

7. The electro-mechanical device of claim 1, wherein the plurality of stator segments completely surround the rotor.

8. The electro-mechanical device of claim 1, wherein the plurality of stator segments includes more than two stator segments.

9. The electro-mechanical device of claim 1, wherein there are a total of N stator segments and N permanent magnets, wherein N is an integer number greater than 2.

10. The electro-mechanical device of claim 1, wherein the rotor has a total of M poles and the stator has a total of N stator segments and wherein N and M are both integers and are not equal.

11. The electro-mechanical device of claim 1, wherein the rotor and the plurality of stator segments comprise a magnetically soft material.

12. The electro-mechanical device of claim 11, wherein the rotor and the plurality of stator segments are composed of a laminated, cast, or sintered magnetically soft material.

13. The electro-mechanical device of claim 1, wherein the plurality of permanent magnets are composed of a magnetically hard material.

14. The electro-mechanical device of claim 1, wherein the rotor and stator form a single phase motor or generator.

15. The electro-mechanical device of claim 1, wherein the rotor and stator form a multiphase phase motor or generator.

16. An electro-mechanical device comprising:
a rotor with a central axis of rotation and a first pole and a second pole; and
a stator enclosing the rotor, the stator comprising:
at least two stator segments;
a first permanent magnet having a north pole and a south pole and disposed with the north pole adjacent to a first stator segment of the at least two stator segments;
a second permanent magnet having a north pole and a south pole separated from the first permanent magnet by the first stator segment, wherein the first permanent magnet and the second permanent magnet have opposite orientations that provide a magnetic flux that passes through the first stator segment; and
a coil wound on the first stator segment between the first permanent magnet and the second permanent magnet, which when energized produces flux that opposes flux from the permanent magnets, such that the flux from the permanent magnets traverses into the rotor.

17. The electro-mechanical device of claim 16, wherein the coil creates a steady state flux and an additional potential is created on the coil as the rotor is rotated.

* * * * *